455-296 SR

FIP8106 XR 3,430,068

1 X 5432E

CROSS REFERENCE SEARCH ROO

Inventor

JAMES E. McTAGGART by: [signature] Agent

3430068

3,430,068

TRANSISTOR NOISE SUPPRESSION NETWORK PARTICULARLY FOR TELEVISION RECEIVERS

James E. McTaggart, Waterloo, Ontario, Canada, assignor to Electrohome Limited, Kitchener, Ontario, Canada Filed Jan. 10, 1966, Ser. No. 519,682
U.S. Cl. 307—237 6 Claims
Int. Cl. H03k 5/08, 5/20

This invention relates to a noise suppression network employing transistors and particularly suited for use in television receivers. It should be noted, however, that while this invention will be described hereinafter in connection with its use in a television receiver, the applicability and field of use of a noise suppression network embodying this invention is not restricted thereto.

Those skilled in the art are aware that it is desirable for the composite video signal that is supplied to the AGC and synchronization circuits of a television receiver to be as free from noise signals as possible, i.e., any noise signal should be suppressed to the extent that it is of less amplitude and hence at a lower level than the level of the sync pulse tips. Many different types of noise suppression circuits have been designed to achieve this result, but even the most pertinent circuit of which I am aware, and which, like the circuit of the instant invention, operates on a subtraction or "bucking" principle, requires the use of a blocking capacitor between the two transistors which are employed as well as two resistors to bias the second transistor.

In accordance with this invention, there is provided a noise suppression network that is simple and economical, requiring only two transistors and three resistors. Thus, a network embodying this invention is adapted for suppressing noise pulses superimposed on an input signal and includes signal combining means from which an output signal with suppressed noise pulses may be taken. Means are employed that provide a first signal path to the signal combining means comprising a first transistor having base, collector and emitter electrodes, an input terminal connected to the base electrode, an output terminal connected to the emitter electrode, and means connecting the output terminal and the signal combining means for supplying the output signal developed at the output terminal to the signal combining means. Means are provided for supplying the input signal to the input terminal. Means including a second transistor connected in phase inverting configuration provide a second signal path to the signal combining means and include also a resistive voltage divider network, means directly connecting the resistive voltage divider network and the emitter electrode of the first transistor, means directly connecting the resistive voltage divider network and the base electrode of the second transistor for supplying a part of the signal developed across the resistive voltage divider network to the base electrode of the second transistor, and means connecting the collector electrode of the second transistor and the signal combining means to subtract signals amplified by the second transistor form those supplied to the signal combining means from the output terminal.

Figure 1:
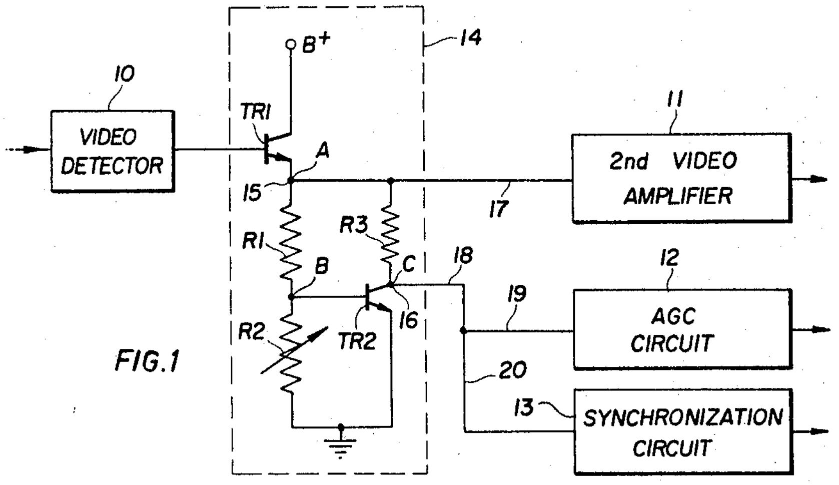
Figure 2:
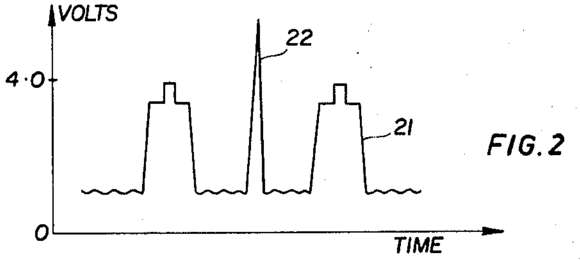
Figure 3:
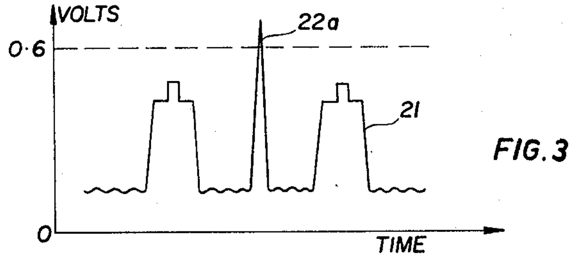
Figure 4:
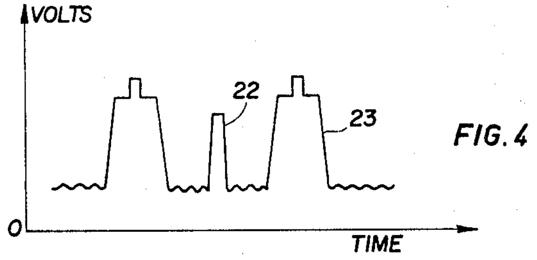

This invention will become more apparent from the following detailed description, taken in conjunction with the appended drawings, in which:

FIGURE 1 is a circuit diagram showing a part of a television receiver with a noise suppression circuit embodying this invention incorporated therein, and FIGURES 2 to 4 are schematic representations of the signals which appear at points A, B, and C respectively in FIGURE 1.

Referring to FIGURE 1, the video detector, second video amplifier and AGC and synchronization circuits of a conventional television receiver are shown in block form and are represented by the numerals 10, 11, 12 and 13 respectively. A noise suppression circuit 14 embodying this invention is shown within the dotted lines in FIGURE 1 and is interposed between the output terminal of video detector 10 and the input terminals of second video amplifier 11, AGC circuit 12 and synchronization circuit 13.

The particular noise suppression circuit illustrated employs two NPN transistors designated TR1 and TR2, a resistive voltage divider network consisting of a fixed resistor R1 and a variable resistor R2, and a signal combining arrangement in the form of a resistor R3. The collector electrode of transistor TR1 is connected to a source of positive potential (B+), while its emitter electrode is connected to an output terminal 15, which also is connected via resistor R3 to the output terminal 16 of transistor TR2 and via a conductor 17 to the input terminal of second video amplifier 11.

Resistors R1 and R2 are connected in series with each other to form a resistive voltage divider network which has one terminal directly connected to the emitter electrode of transistor TR1 and the other terminal connected to ground. The junction of resistors R1 and R2 is directly connected to the base electrode of transistor TR2 for supplying a part of the signal developed across the resistive voltage divider network to the base electrode of transistor TR2. The emitter electrode of transistor TR2 also is connected to ground, and it will be apparent that transistor TR2 is connected in phase inverting configuration, i.e., will produce an output signal at terminal 16 that is 180° out of phase with respect to the input signal applied to the base electrode of transistor TR2. Output terminal 16 is connected via conductors 18 and 19 to the input terminal of AGC circuit 12 and via conductors 18 and 20 to the input terminal of synchronization circuit 13.

When the composite video signal supplied from video detector 10 to the base electrode of transistor TR1, which serves as the first video amplifier, does not contain any noise pulses having an amplitude greater than the amplitude of the sync pulse tips, transistor TR2 will not conduct, since the voltage division ratio of resistors R1 and R2 is chosen such that, under these conditions, the voltage developed at point B never will become positive enough to reach the value of $V_{BE}$ required to make transistor TR2 conduct (about +0.6 volt for most NPN transistors). Resistor R3 should be chosen so that it is small enough, under these conditions, that it has little direct effect on the composite video signal supplied to the AGC and sync circuits during noise-free operation.

When strong impulse noise is present, however, the tips of the noise pulses will cause base current pulses to flow in transistor TR2. Thus, referring to FIGURE 2, there is shown the waveform 21 of a composite video signal containing a noise pulse 22 and which may appear at output terminal 15 (point A). If noise pulse 22 is sufficiently large in amplitude that it creates a voltage at point B in excess of the voltage required to make transistor TR2 conduct, the tips 22*a* (FIGURE 3) of the noise pulse will be amplified by transistor TR2 and the phase thereof inverted. The signal amplified by transistor TR2 and the signal appearing at output terminal 15 are combined (added algebraically) by resistor R3 to produce an output signal at point C which may have the waveform shown in FIGURE 4 at 23, where it will be seen that by virtue of cancellation, noise pulse 22 has been suppressed to a level below that of the level of the sync pulse tips. Signal 23 with noise pulse 22 suppressed is supplied to AGC and synchronization circuits 12 and 13, while signal 21 is supplied via conductor 17 to second video amplifier 11.

By adjusting the resistance of resistor R2, one can vary the degree of noise suppression which is obtained to the extent that transistor TR2 can be made to become conductive as soon as a noise pulse is received at point B that has an amplitude greater than the amplitude of the sync pulse tips.

Of course, an equivalent circuit of negative-going, rather than positive-going video polarity, could be formed by reversing the polarity of the diode in video detector 10 and by using a PNP transistor for transistor TR2.

A circuit embodying this invention which has been operated satisfactorily and which is of the type shown in FIGURE 1 employed the following components:

| | |
|---|---|
| Transistor TR1 | 2N3691 |
| Transistor TR2 | 2N3691 |
| Resistor R1 | 300Ω |
| Resistor R2 | 51Ω |
| Resistor R3 | 47Ω |

It will be seen from the foregoing that, in accordance with this invention a simple but effective noise suppression circuit which requires on a source of potential, three resistors and two transistors is provided.

While a preferred embodiment of this invention has been disclosed herein, those skilled in the art will appreciate that changes and modifications may be made therein without departing from the spirit and scope of this invention.

What I claim as my invention is:

1. A network adapted for suppressing noise pulses superimposed on an input signal comprising: signal combining means from which an output signal may be taken; means providing a first signal path to said signal combining means comprising a first transistor having base, collector and emitter electrode, an input termnial connected to said base electrode, an output terminal connected to said emitter electrode, and means connecting said output terminal and said signal combining means for supplying the output signal developed at said output terminal to said signal combining means; means for supplying said input signal to said input terminal; and means including a second transistor connected in phase inverting configuration providing a second signal path to said signal combining means, said second transistor also having base, collector and emitter electrodes, said last-mentioned means also including a resistive voltage divider network, means directly connecting said resistive voltage divider network and said emitter electrode of said first transistor, means directly connecting said resistive voltage divider network and said base electrode of said second transistor for supplying a part of the signal developed across said resistive voltage divider network to said base electrode of said second transistor, and means connecting said collector electrode of said second transistor and said signal combining means to add algebraically signals amplified by said second transistor and signals supplied to said signal combining means from said output terminal.

2. A network according to claim 1 wherein said signal combining means is a resistor having two terminals, one of said terminals being connected to said output terminal, the other of said terminals being connected to said collector electrode of said second transistor.

3. A network according to claim 2 wherein said first and second transistors are NPN transistors.

4. A network according to claim 1 wherein said resistive voltage divider network comprises first and second resistors each having two terminals, one of said terminals of each of said resistors being connected together and to said base electrode, the other of said terminals of said first resistor being connected to said emitter electrode of said first transistor, the other of said terminals of said second resistor and said emitter electrode of said second transistor being connected together.

5. A network according to claim 4 wherein said signal combining means is a resistor having two terminals, one of said terminals being connected to said output terminal, the other of said terminals being connected to said collector electrode of said second transistor.

6. A network according to claim 5 wherein said first and second transistors are NPN transistors.

References Cited

UNITED STATES PATENTS

| | | | |
|---|---|---|---|
| 2,698,898 | 1/1955 | Cooper | 330—194 XR |
| 2,920,194 | 1/1960 | Geiger et al. | 328—168 |
| 2,935,625 | 5/1960 | Schayes | 307—237 |

ARTHUR GAUSS, *Primary Examiner.*

STANLEY T. KRAWCZEWICZ, *Assistant Examiner.*

U.S. Cl. X.R.

307—235; 325—475; 328—169; 330—18